United States Patent [19]
Raggi

[11] Patent Number: 5,147,028
[45] Date of Patent: Sep. 15, 1992

[54] DEVICE TO RECOVER THE PAINT FROM BELT CONVEYORS IN SPRAY PAINTING PLANTS

[75] Inventor: Gianni Raggi, Imola, Italy
[73] Assignee: Cefla-Soc. Coop. A R.L., Imola, Italy
[21] Appl. No.: 600,822
[22] Filed: Oct. 22, 1990
[30] Foreign Application Priority Data
  Oct. 24, 1989 [IT] Italy ............... 21988/89[U]
[51] Int. Cl.⁵ ............................................. B65G 45/00
[52] U.S. Cl. .................................. 198/495; 198/497; 15/256.51; 101/425; 118/70; 118/203
[58] Field of Search ............... 198/495, 497, 498, 499; 15/256.5, 256.51; 101/425; 118/70, 203, 261

[56] References Cited
U.S. PATENT DOCUMENTS 3,009,439 11/1961 Wald, Jr. et al.
3,583,555 6/1971 Karsnak et al. ............. 198/495
3,815,728 6/1974 Vaughan ...................... 198/498 X
3,983,888 10/1976 Edwards ...................... 198/498 X
4,392,742 7/1983 Landa ......................... 101/425 X
4,976,342 12/1990 Hwang ........................ 198/495

FOREIGN PATENT DOCUMENTS
1022899 6/1983 U.S.S.R. ....................... 198/495
1020686 2/1966 United Kingdom ............... 198/497

Primary Examiner—Joseph E. Valenza
Assistant Examiner—Tuan N. Nguyen
Attorney, Agent, or Firm—Young & Thompson

[57] ABSTRACT

Device to recover paint from belt conveyors passing about drums in spray painting plant. A cylinder parallel to the drums of the belt conveyor is driven to rotate in the same direction as the drum and is pressed against an outer surface of the belt so that the adjacent surfaces of the cylinder and of the belt move opposite to each other. The cylinder has a smooth and hard surface and is positioned close to the lower surface of the downstream drum of the conveyor. A scraper extends full width of the cylinder to scrape off the paint on the surface of the cylinder and to collect the scraped-off paint. The lower portion of the cylinder is immersed in a solvent vat.

5 Claims, 1 Drawing Sheet

U.S. Patent
Sep. 15, 1992
5,147,028
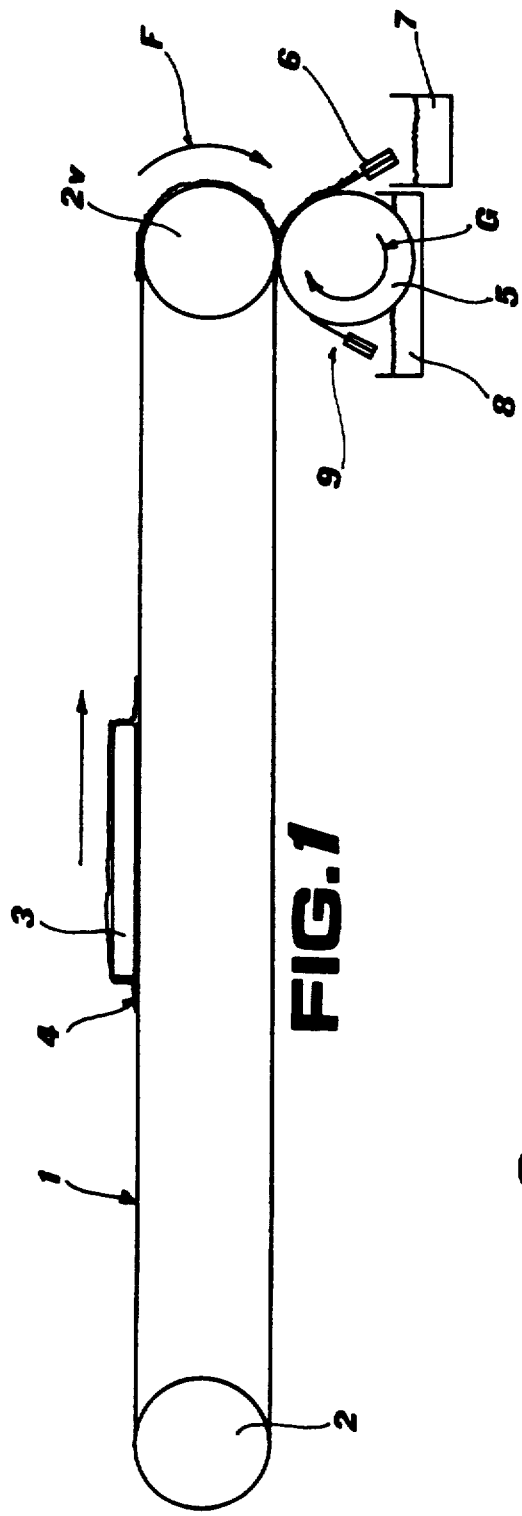
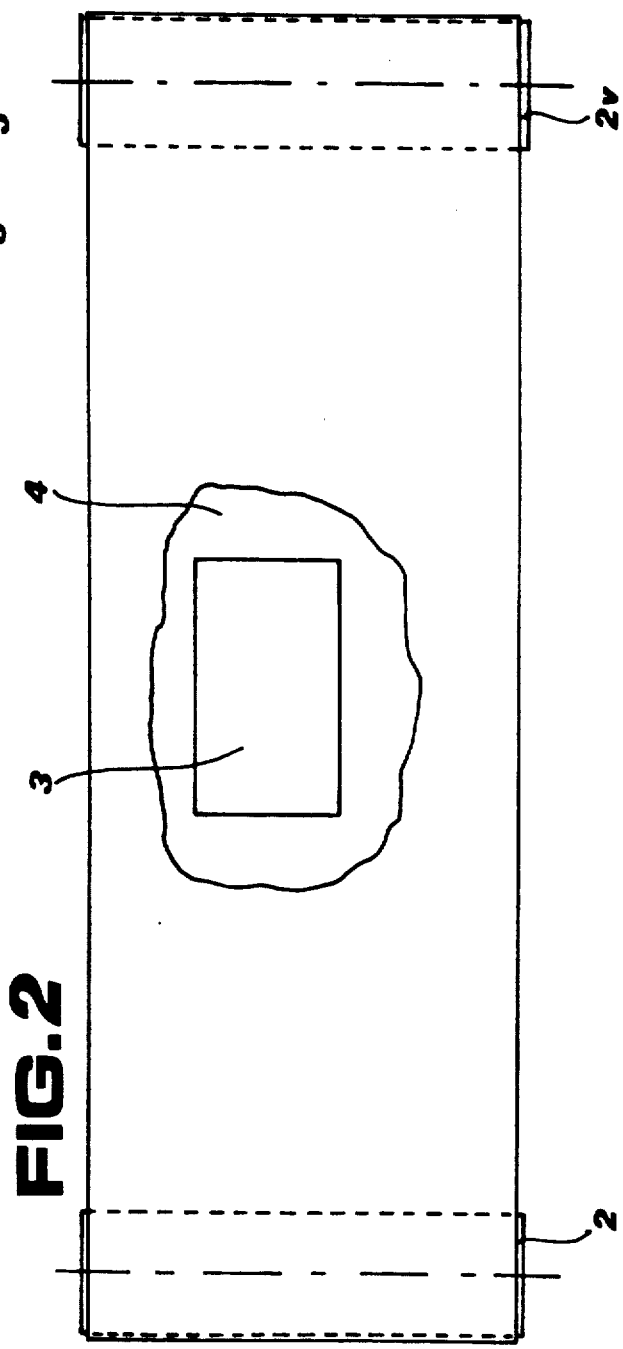

DEVICE TO RECOVER THE PAINT FROM BELT CONVEYORS IN SPRAY PAINTING PLANTS

BACKGROUND OF THE INVENTION

1. Field of the Invention

The present invention concerns a device to recover the paint from belt conveyors supporting and moving the objects to the painted in automatic spray painting plants.

The problem to be faced in the aforespecified conveyors mainly involves the smearing of the conveying means, determined by the paint being sprayed which misses the object to be painted—thereby adhering to said means—and cannot be recovered. The smearing of the conveyor and the failure to recover the paint missing the objects to be painted give rise to various negative consequences and should hence be eliminated as far as possible.

Among the most important of these consequences, the following should be particularly remembered:
- the drying up of the paint creates obstacles and hinders the regular working of the movable elements of the conveyor;
- the waste of a considerable amount of paint, which may reach even 40-50% of the total amount of paint used;
- the smearing of the objects to be painted, subsequently positioned on the conveyor, by the paint deposited thereon and not yet fully dried, when the conveyor is not constantly and perfectly cleaned therefrom; and finally,
- the ecological consequences deriving from the elimination of the paint scattered on the conveyor and not recovered.

The device according to the present invention allows to efficiently and automatically recovering the excess paint sprayed onto the conveyor belt around the object being painted, while considerably reducing the stresses imparted to said belt as compared to the known type paint recovery devices.

2. Description of the Prior Art

The systems currently adopted for cleaning belt conveyors consist of fixed or oscillating scraping elements, which act on the surface of the belt conveyor, both in the event of this latter being a single steel or synthetic material belt, and in the event that it should instead be formed of a plurality of steel strips. These scraping elements usually consist of a flexible blade of steel, when the belt is formed of steel, or of a plastic beak-shaped section, when the belt is of plastic material. In both cases, in order to obtain a proper cleaning of the belt, the scraping means are pressed into contact with the belt surface with a high pressure, so that the scraping action determined by the contact may totally remove the excess paint applied when spraying.

Nevertheless, the aforedescribed paint recovery devices suffer from a great number of drawbacks, which have limited their application and have led users to adopt protection systems for the conveyor belt, which make use of expendable materials protecting the belt from paint deposits and being renewed at each painting cycle.

A first drawback of the known paint recovery systems is the incomplete and irregular removal of the drying paints due to their high viscosity. The paint recovery device is in practice positioned at a certain distance from the painting area (normally in correspondence of the return part of the belt), and during the time taken for the belt to cover this distance the sprayed paint has already lost a considerable amount of solvents, consequently increasing its viscosity and making it difficult to entirely remove it from the belt. For the same reason, the removed paint does not easily drop from the scraping means which become, more or less rapidly, covered with paint, making it even more difficult to remove the paint from the belt. Furthermore, in case of stopping of the plant, the paint accumulated on the scraping means quickly becomes solid, causing said means to stick to the belt and making it hence indispensable to stop the plant even longer for cleaning.

To try to overcome the above problem—making it thus possible to remove the already partially dried and thus particularly viscous paints—it is known to increase the pressure of the scraping means on the belt to rather high values. This however creates other inconveniences. On the one hand, the wear by friction of the belt and of the actual scraping means is in fact strongly accelerated, to the extent that, in order to prevent irregular wear—and thus an irregular cleaning of the belt—an oscillating movement in a direction transverse to the movement of the belt is often imparted to the scraping means. On the other hand, the friction between the scraping means and the belt results in; a considerable waste of energy, with a consequent requirement to oversize the power of the motor driving the belt.

SUMMARY OF THE INVENTION

The object of the present invention is to overcome the aforementioned drawbacks and disadvantages of the known solutions, and particularly to supply a device to recover the paint sprayed in excess onto the surface of a conveyor belt, adapted to provide for a complete and homogeneous recovery, while substantially reducing the amount of total energy dispersed in the device.

According to the present invention, said object is reached by a device to recover the paint from belt conveyors in spray painting plants, characterized in that it comprises a cylinder whose axis is parallel to the axes of the drums of the belt conveyor and which rotates in the same direction as those drums, positioned in contact with the belt close to the lower surface of the downstream drum of said conveyor, and means to scrape off the paint clinging to the surface of said cylinder.

BRIEF DESCRIPTION OF THE DRAWINGS

The invention will now be described more clearly with reference to the accompanying drawing, which shows a preferred embodiment thereof and in which:

FIG. 1 is a side elevational view of a belt conveyor for spray painting plants, including the paint recovery device of the present invention; and FIG. 2 is a plan view of the same belt conveyor of FIG. 1, from which—to make the drawing clearer—the device of the present invention has been removed.

DESCRIPTION OF THE PREFERRED EMBODIMENT

The drawings show a belt conveyor formed of a belt 1, which moves between two drums 2 following the direction indicated by the arrow F. The objects 3 to be painted are loaded on the belt 1 and they are spray painted in known manner while being transported on the belt conveyor. Due to the intrinsic characteristics of the spray painting process, the jet of sprayed paint cannot be exactly limited to the surface of the objects to be painted and thus, at the end of the operation, an area of the belt surrounding each object 3 turns out to be covered with paint.

The device of the present invention proposes to recover said paint, so that it can be used again for painting, and this is particularly useful in the case of UV paints which dry only after exposition to UV rays.

Said device consists of a chromium plated polished steel cylinder 5, positioned in contact with the return run of the belt 1 close to the downstream drum 2v of the belt conveyor. The cylinder 5 is caused to rotate by its own motor means (not shown) in the direction indicated by the arrow G, that is, in a direction such that its periphery moves in a direction opposite to the direction of movement of the adjacent portion of belt 1. The radial position of the cylinder 5 in respect of the belt 1 can be adjusted—both parallely and perpendicularly to the belt 1, according to the type of paint having to be removed and to its degree of viscosity—from a position in which the cylinder is simply in contact with the belt 1, up to positions in which the cylinder is pressed against said belt 1, causing the belt to deviate to a smaller or greater extent from the rectilinear path between the two drums 2, thereby correspondingly increasing the action of paint removal.

Thus, by suitably adjusting the rotation speed of the cylinder 5 and its radial position, one obtains the wanted result, namely that the paint deposited on the belt area 4 is perfectly and totally transferred onto the surface of the cylinder 5. The paint thus recovered, is immediately removed from the surface of the cylinder 5 by a fixed or oscillating scraper 6 acting against said surface, so as to be collected in a vessel 7 whence it is drawn for subsequent use or elimination.

In order to reduce even further the already slight friction between the cylinder 5 and the belt 1, the cylinder 5 is continuously wetted with a solvent of the paint being recovered. This allows obtaining, as well as a substantial reduction in the friction, also a thinning of paint to be recovered from the belt conveyor, thereby facilitating both its transfer onto the cylinder 5 and its removal therefrom by the scraper 6 and subsequent re-utilization. Preferably, said result is obtained by keeping the lower surface of the cylinder 5 immersed in a container 8 filled with solvent, and by regulating the thickness of the film of solvent adhering to the surface of the cylinder 5 by means of an adjustable scraper 9.

From the above description it can be clearly understood how the present invention has fully achieved the recited objects. The friction losses are in fact drastically reduced, both due to the geometry and to arrangement of the parts, and due to the continuous presence of a film of solvent acting as a lubricant, and finally because also the friction between the scraper 6 and the cylinder 5 is very low thanks to the perfectly smooth surface of said cylinder 5. The excess paint collected on the belt 1 is removed in a complete and homogeneous manner throughout the width of the belt, thanks to the fact that the position and speed of the cylinder 5 can be adjusted as best so as to suit any particular condition; the presence of the film of solvent finally helps to remove also paint which is already in an advanced drying state.

I claim:

1. Device to recover paint from belt conveyors passing about drums in spray painting plants, comprising a cylinder parallel to the drums of the belt conveyor, driven to rotate in the same direction as said drums and contacting an outer surface of said belt so that the adjacent surfaces of the cylinder and of the belt move opposite to each other, the cylinder having a smooth and hard surface and being positioned close to the lower surface of the downstream drum of said conveyor, means extending full width of the cylinder to scrape off the paint on said surface of the cylinder, and wetting means contacting said cylinder downstream of said means to scrape off the paint, in order to deposit a film of solvent on said surface of said cylinder.

2. Device as claimed in claim 1, said wetting means comprising a container filled with solvent, in which a lower surface of said cylinder is immersed, and further scraping means to regulate the thickness of the film of solvent collected by the cylinder from said container.

3. Device as claimed in claim 1, wherein said cylinder has a peripheral surface that is of chromium-plated polished steel.

4. A device as claimed in claim 1, in which said cylinder is pressed against said outer surface of the belt.

5. A device as claimed in claim 1, and means to collect the paint scraped off the surface of the cylinder.

* * * * *